US010962865B2

(12) United States Patent
Ujiie et al.

(10) Patent No.: US 10,962,865 B2
(45) Date of Patent: Mar. 30, 2021

(54) CAMERA PLATFORM SYSTEM

(71) Applicant: CANON KABUSHIKI KAISHA, Tokyo (JP)

(72) Inventors: Hirotaka Ujiie, Yokohama (JP); Akira Hiraoka, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/661,887

(22) Filed: Oct. 23, 2019

(65) Prior Publication Data
US 2020/0133099 A1 Apr. 30, 2020

(30) Foreign Application Priority Data

Oct. 31, 2018 (JP) .............................. JP2018-205865

(51) Int. Cl.
| | | |
|---|---|---|
| G03B 17/56 | (2021.01) | |
| F16L 3/06 | (2006.01) | |
| F16M 11/06 | (2006.01) | |
| H04N 5/232 | (2006.01) | |
| H04N 7/08 | (2006.01) | |

(52) U.S. Cl.
CPC .............. *G03B 17/561* (2013.01); *F16L 3/06* (2013.01); *F16M 11/06* (2013.01); *H04N 5/23296* (2013.01); *H04N 5/23299* (2018.08); *H04N 7/08* (2013.01)

(58) Field of Classification Search
CPC .... G03B 17/561; G03B 17/566; F16M 11/02; F16M 11/022; F16M 11/20; F16M 11/2092; F16M 11/06; H04N 5/232; H04N 5/23299; F16L 3/02; F16L 3/01; F16L 3/015
See application file for complete search history.

(56) References Cited

U.S. PATENT DOCUMENTS

| 6,231,020 B1* | 5/2001 | Willson ................. | A47B 11/00 248/349.1 |
| 2015/0219981 A1* | 8/2015 | Roberts ................. | F16M 13/04 348/375 |
| 2016/0170289 A1* | 6/2016 | Matt ..................... | F16M 11/12 318/560 |

(Continued)

FOREIGN PATENT DOCUMENTS

| JP | 2010166218 A | 7/2010 |
| JP | 2010533884 A | 10/2010 |

*Primary Examiner* — Christopher E Mahoney
(74) *Attorney, Agent, or Firm* — Canon U.S.A., Inc. IP Division

(57) ABSTRACT

A camera platform system includes a fixing base configured to fix an imaging apparatus, a camera platform configured to rotate the imaging apparatus fixed to the fixing base, a control apparatus configured to control the imaging apparatus, a clamp unit configured to clamp a connector cable, and a fixing unit configured to attach the clamp unit to the control apparatus. The control apparatus includes a first connector portion to which a connector cable for connecting to the camera platform is connected. The clamp unit includes a plurality of column members and a supporting member for supporting the plurality of column members. The fixing unit fixes the supporting member to the control apparatus. The clamp unit can be in a state where the clamp unit does not overlap with the first connector portion of the control apparatus in an optical axis direction.

17 Claims, 21 Drawing Sheets

(56) References Cited

U.S. PATENT DOCUMENTS

2017/0052432 A1* 2/2017 Taxier .................. H04N 5/2251
2019/0324353 A1* 10/2019 Liwszyc ................ H02K 7/003
2020/0133098 A1* 4/2020 Miura .................. F16M 11/125

* cited by examiner

: IMAGE CAPTURING RANGE OF MAIN CAMERA

CAMERA PLATFORM SYSTEM

BACKGROUND OF THE DISCLOSURE

Field of the Disclosure

The disclosure relates to a camera platform system that can drive an imaging apparatus to perform at least any one of panning, tilting, and rolling rotation operations.

Description of the Related Art

In a camera platform system for driving panning and tilting operations of an imaging apparatus mounted thereon, the imaging apparatus or a control apparatus of the imaging apparatus includes an electrical connector for connecting with an external apparatus.

Japanese Unexamined Patent Application Publication No. 2010-533884 discusses a camera platform system having a rotator apparatus in addition to a panning/tilting drive mechanism for rotating an imaging apparatus about an optical axis during image capturing. In a state where many connector cables connect between the imaging apparatus, the control apparatus, and the camera platform, the cables may be caught during settings and panning/tilting operations of the camera platform, and connectors may possibly be disconnected or damaged.

Japanese Patent Application Laid-Open No. 2010-466218 discusses a structure in which a cable is fixed by being wound around a column member in a fixing member to avoid a load from being applied to a connector if the cable is pulled.

However, a cable fixing method discussed in Japanese Patent Application Laid-Open No. 2010-166218 does not take into consideration connection and disconnection operations of the cable and may possibly hinder the connection and disconnection operations of the cable.

SUMMARY OF THE DISCLOSURE

According to an aspect of the disclosure, a camera platform system includes a fixing base configured to fix an imaging apparatus, a camera platform configured to rotate the imaging apparatus fixed to the fixing base in at least one of the panning, tilting, and rolling directions, a control apparatus configured to control the imaging apparatus, a clamp unit attached to the control apparatus and configured to clamp a connector cable for connecting between the control apparatus and the camera platform, and a fixing unit configured to attach the clamp unit to the control apparatus. The control apparatus includes a first connector portion to which a connector cable for connecting to the camera platform is connected. The clamp unit includes a plurality of column members and a supporting member for supporting the plurality of column members. The fixing unit fixes the supporting member to the control apparatus. The clamp unit can be in a state where the clamp unit does not overlap with the first connector portion of the control apparatus in an optical axis direction.

Further features and aspects of the disclosure will become apparent from the following description of example embodiments with reference to the attached drawings.

DESCRIPTION OF THE EMBODIMENTS

Figure 1:
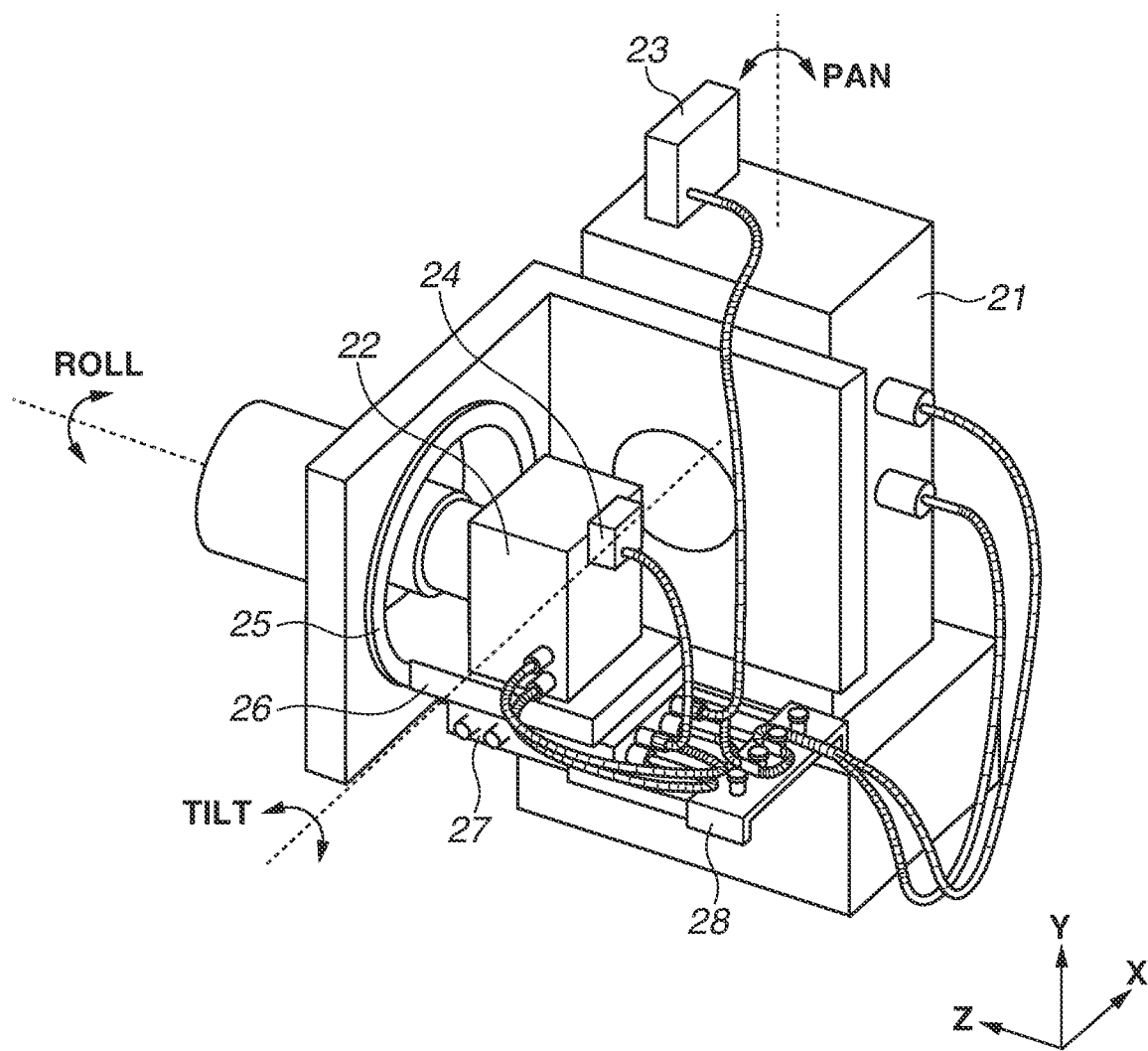
FIG. 1 is a perspective view illustrating a first example embodiment.

Example embodiments of the disclosure will be described in detail below with reference to the accompanying drawings. However, each component according to the example embodiments is to be considered as an example and does not limit the disclosure.

A first example embodiment of the disclosure will be described below with reference to the perspective view in FIG. 1 and the block diagram in FIG. 2. In the first example embodiment, a camera platform system that performs at least one of the panning, tilting, and rolling operations of an imaging apparatus is described. In the camera platform system, a cable can be fixed by a method that hardly hinders connection and disconnection operations of the cable.

A camera rotation system according to the example embodiment includes an operation unit 10 and a camera platform system 20. When an operator operates the operation unit 10, an operation instruction according to contents of an operation is transmitted from the operation unit 10 to the camera platform system 20 via a network. The camera platform system 20 performs control based on the received operation instruction to remotely control the camera platform system 20 from the operation unit 10.

The camera platform system 20 includes a camera platform 21, a main camera 22, a wide-angle imaging camera 23, a finder imaging camera 24, a fixing base for fixing the main camera 22 (referred to as a camera stand 26), a control box unit 27, and a cable clamp unit 28. In the descriptions of the example embodiment, directions indicated by the arrows illustrated in FIG. 1 are defined as the X, Y, and Z directions. The Z direction is an optical axis direction of the main camera 22 when the main camera 22 is fixed to the camera stand 26.

In the Z direction, a face viewed from a lens side (upstream side of the optical axis) of the main camera 22 is referred to as a front face, and a face opposite to the front face is referred to as a rear face. A face viewed from the right-hand side with respect to the front side is referred to as a right-hand side face. A face viewed from the left-hand side with respect to the front side is referred to as a left-hand side face. A face viewed from the upper side with respect to the front side is referred to as a top face. A face viewed from the lower side with respect to the front side is referred to as a bottom face. When the camera platform system 20 is projected in the Z direction, the front and the rear faces have an area, but the right-hand side face, the left-hand side face, the top face, and the bottom face do not have an area (i.e., projected as line segments). If apparatuses and units of the camera platform system 20 are inclined relative to the Z direction, a face having a larger width (longer length in the X direction) when projected in the Z direction is referred to as the front or rear face, and a face having a smaller width when projected in the Z direction is referred to as a side face.

The camera platform 21 controls fixation of the main camera 22 and driving of the main camera 22 in panning, tilting, and rolling directions. The camera platform 21 includes an interface unit 211 and a drive control unit 212. The interface unit 211 mainly performs communication and video image processing. The drive control unit 212 mainly controls various motors.

The interface unit 211 includes an interface central processing unit (CPU) 2111, an image processing unit 2112, and a communication unit 2113. The drive control unit 212 includes a drive control CPU 2121, motor control units 2122 (2122a to 2122d), and motors 2123 (2123a to 2123d) for the zooming, rolling, tilting, and panning operations.

An operation instruction from the operation unit 10 is transmitted to the interface CPU 2111 via the communication unit 2113. When the operation instruction is a panning drive control instruction, a panning drive control instruction is transmitted from the interface CPU 2111 to the drive control unit 212 and is given to the panning control unit 2122a via the drive control CPU 2121. Then, the drive control CPU 2121 drives the panning motor 2123a in response to the panning drive control instruction via the panning control unit 2122a.

Likewise, when the operation instruction is a tilting drive control instruction, the drive control CPU 2121 controls the tilting motor 2123b via the tilting control unit 2122b. When the operation instruction is a rolling drive control instruction, the drive control CPU 2121 controls the rolling motor 2123c via the rolling control unit 2122c. When the operation instruction is a zooming drive control instruction, the drive control CPU 2121 controls the zooming motor 2123d via the zooming control unit 2122d. Thus, the drive control unit 212 functions as a drive unit of each camera.

Figure 2:
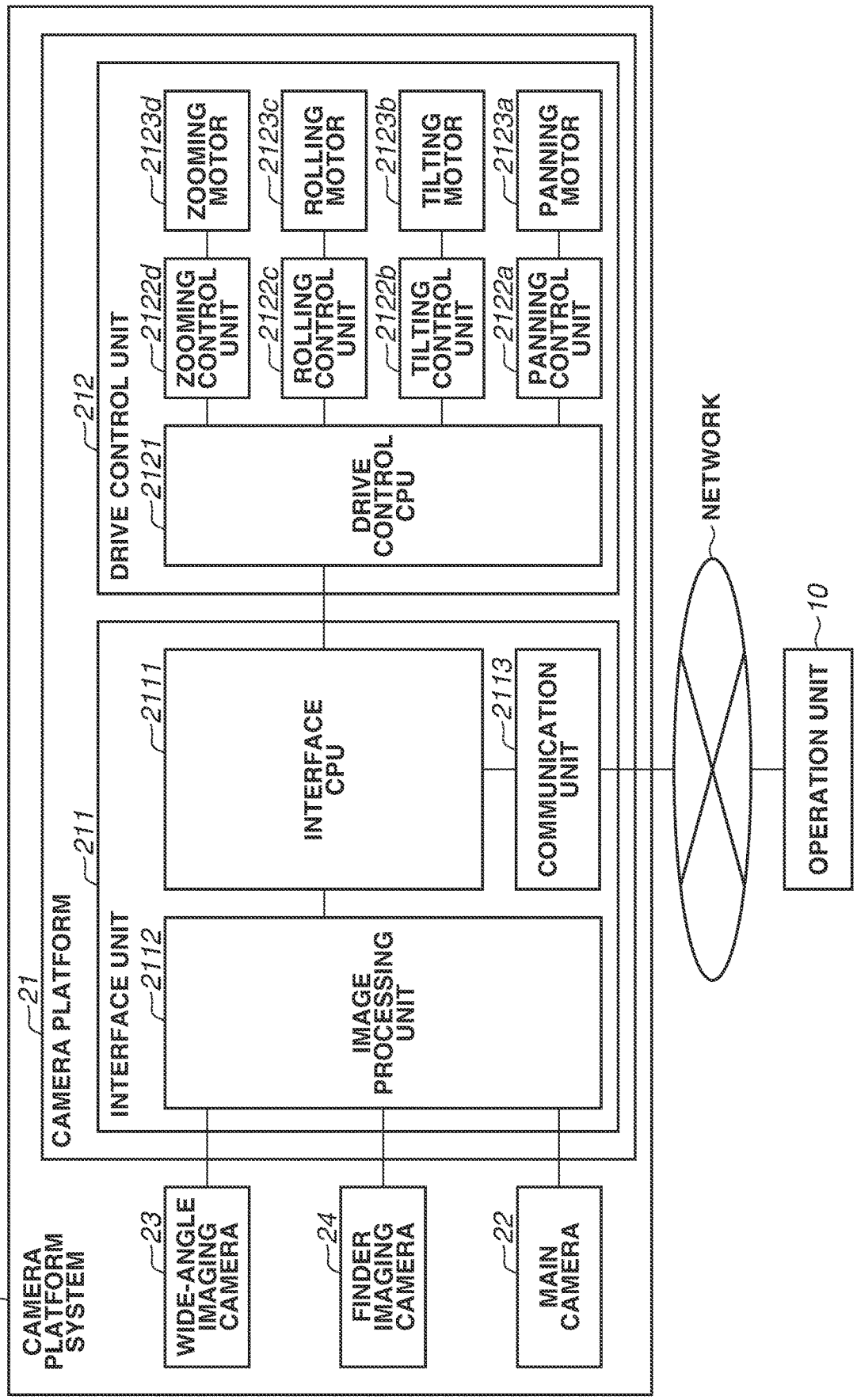
FIG. 2 is a block diagram illustrating the first example embodiment.

A rotator 25 illustrated in FIG. 1 is a rotation mechanism for rotating the main camera 22 in a roll direction in the drive control unit 212. The rotator 25 includes the above-described rolling motor 2123c.

The image processing unit 2112 transmits video images output from the main camera 22, the wide-angle imaging camera 23, and the finder imaging camera 24 to the interface CPU 2111. The interface CPU 2111 transmits a video image from each of the cameras and communication data (for example, information about a position and orientation of each of the cameras) usable to operate each of the cameras to the operation unit 10 via the communication unit 2113 to be displayed on the operation unit 10. By using one transmission path when transmitting a video image from each of the cameras to the operation unit 10, a delay between images can be reduced compared with a case where a plurality of transmission paths is used for each video image. As described below, video images to be transmitted to the operation unit 10 may be from some of the cameras.

Figure 3:
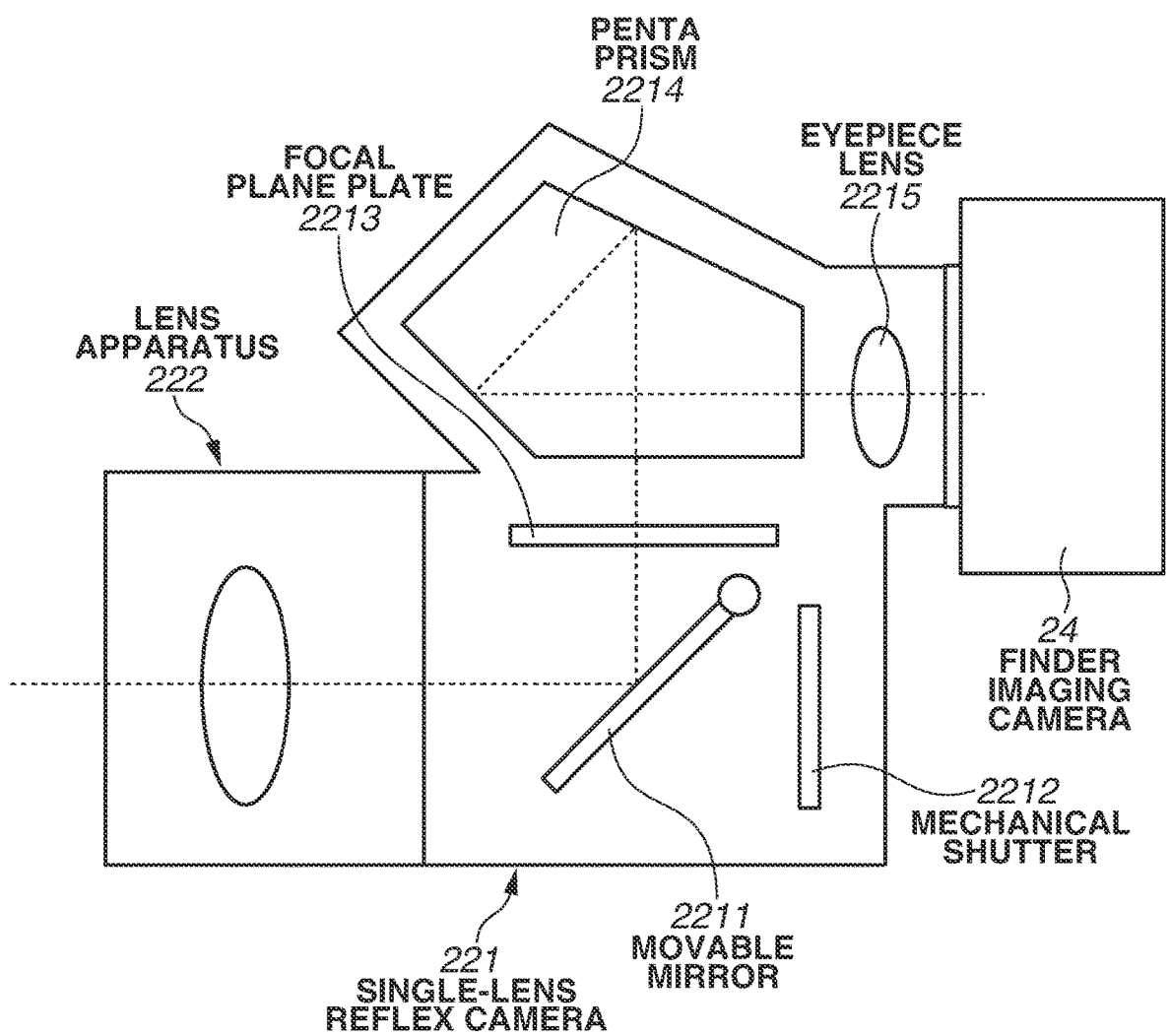
FIG. 3 is a diagram illustrating a configuration of a main camera and a finder imaging camera according to the first example embodiment.

An example of a configuration of the main camera 22 and the finder imaging camera 24 is illustrated in FIG. 3.

The main camera 22 includes a single-lens reflex camera (i.e., still camera) 221 for still image capturing, and a lens apparatus 222. In a normal mode in which the main camera 22 is not performing image capturing, a movable mirror 2211 is obliquely disposed in front of a mechanical shutter 2212, a light flux that has passed the lens apparatus 222 is reflected upward by the movable mirror 2211 and once focused on a focal plane plate 2213. The light flux focused on the focal plane plate 2213 passes through a penta prism 2214 and an eyepiece lens 2215 and reaches the finder imaging camera 24.

At the time of image capturing using the main camera 22, the movable mirror 2211 rotates about a rotational axis (not illustrated) so as to be flipped up. In this case, the light flux that has passed the lens apparatus 222 passes through the mechanical shutter 2212 and reaches an image sensor (not illustrated).

The above-described configuration of the main camera 22 and the finder imaging camera 24 enables the finder imaging camera 24 to capture the same video image as the video image captured by using the main camera 22.

Low-delay video image transmission is achieved, for example, by using a camera with a low pixel and low frame rate compared with the main camera 22 as the finder imaging camera 24. More specifically, by using video images of the wide-angle imaging camera 23 and the finder imaging camera 24 as video images to be output from the interface unit 211 to the operation unit 10 via the network when performing image capturing, delay in operator's image capturing timing can be suppressed. In addition, by using a camera with a low power consumption compared with the main camera 22 as the finder imaging camera 24, power consumption of the camera platform system 20 can be reduced. If the finder imaging camera 24 satisfies at least one of conditions including a low pixel, a low frame rate, and low power consumption compared with the main camera 22, effect corresponding to the satisfied conditions can be acquired.

A relation between video images captured by using the main camera 22 and the wide-angle imaging camera 23 will be described below with reference to examples illustrated in FIGS. 4A, 4B, 4C, 4D, 4E, and 4F.

Figure 4A:
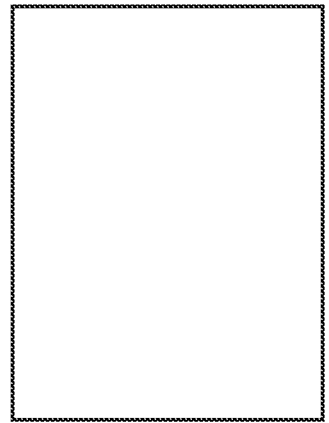
FIGS. 4A, 4B, 4C, 4D, 4E, and 4F are diagrams illustrating examples of video images captured by using the main camera and a wide-angle imaging camera according to the first example embodiment.
Figure 4B:
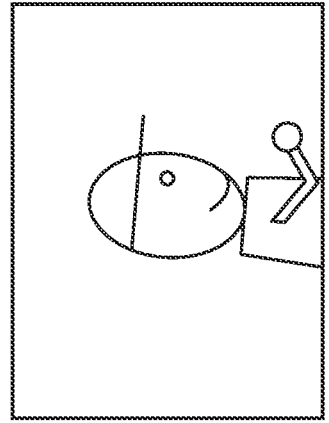
Figure 4C:
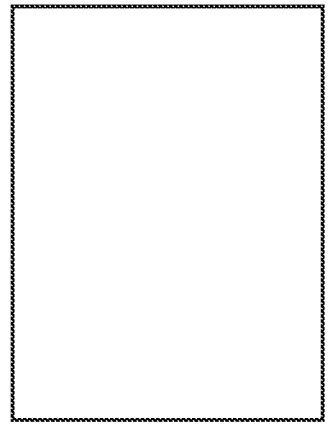
Figure 4D:
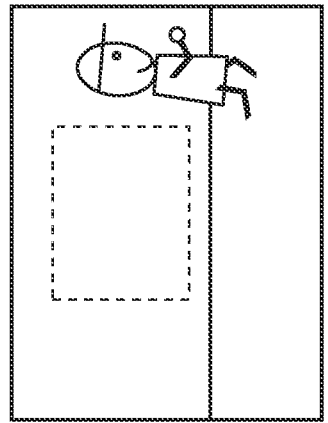
Figure 4E:
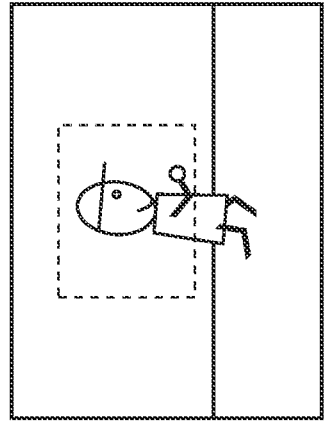
Figure 4F:
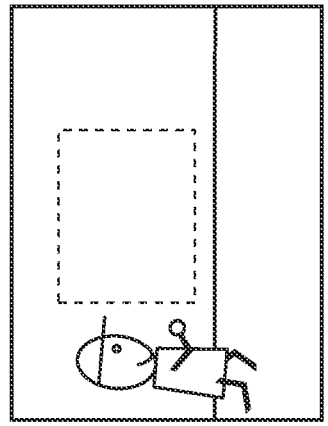

FIGS. 4A to 4C illustrate examples of video images of a moving subject captured by using the main camera 22 and arranged in a time series. Similarly, FIGS. 4D to 4F illustrate examples of video images captured by the wide-angle imaging camera 23 and arranged. For the convenience of description, an image capturing range of the main camera 22 is indicated with dashed lines.

When capturing a video image of the moving subject by using the main camera 22, the subject can be viewed in some video images for a short period of time as illustrated in FIGS. 4A to 4C. When image-capturing the subject in a close-up within a video image, as illustrated in FIG. 4B, the operator can find it very hard to match the image capture timing with movement of the subject if the subject within the angle of view is moving at a high moving speed. In particular, when a transmission delay exists between the camera platform system 20 (main camera 22) and the operation unit 10, the operator can miss an image capture timing if the operator recognizes the subject on a screen of the operation unit 10 and then operates the operation unit 10 to start the image capturing.

On the other hand, the user can more correctly check the subject's position by viewing the video image of the wide-angle imaging camera 23, as illustrated in FIGS. 4D to 4F. This makes it easier for the operator to match the image capture timing with movement of the subject than in a case where the operator checks the position in a video image captured by the angle of view of the main camera 22.

By using the video image from the wide-angle imaging camera 23 in this way, the operator can accurately recognize the image capture timing of the moving subject. Since the operator can recognize the subject's position, the operator can easily perform the panning and tilting operations based on the subject's position.

As described above, the operator can easily find a right image capture timing by displaying a live view of video images from the wide-angle imaging camera 23 and the finder imaging camera 24 provided separately from the main camera 22.

Video images from the wide-angle imaging camera 23 and the finder imaging camera 24 can be combined in a manner such that the relation between angles of view of the video images are recognizable, and the video image after the combination may be transmitted to the operation unit 10.

The main camera 22, the wide-angle imaging camera 23, and the finder imaging camera 24 perform rotation operations by using the same rotational axis. Thus, these cameras are not subject to influences of rotations, such as misalignment between the cameras, whereby complicated correction or cooperation is not necessary. In addition, since the interface CPU 2111 transmits video images from these cameras via one transmission path, it is possible to suppress a difference in a delay amount due to different transmission methods or transmission paths. This enables configuration of an imaging system in which the operator can easily match the image capture timing.

Figure 5:
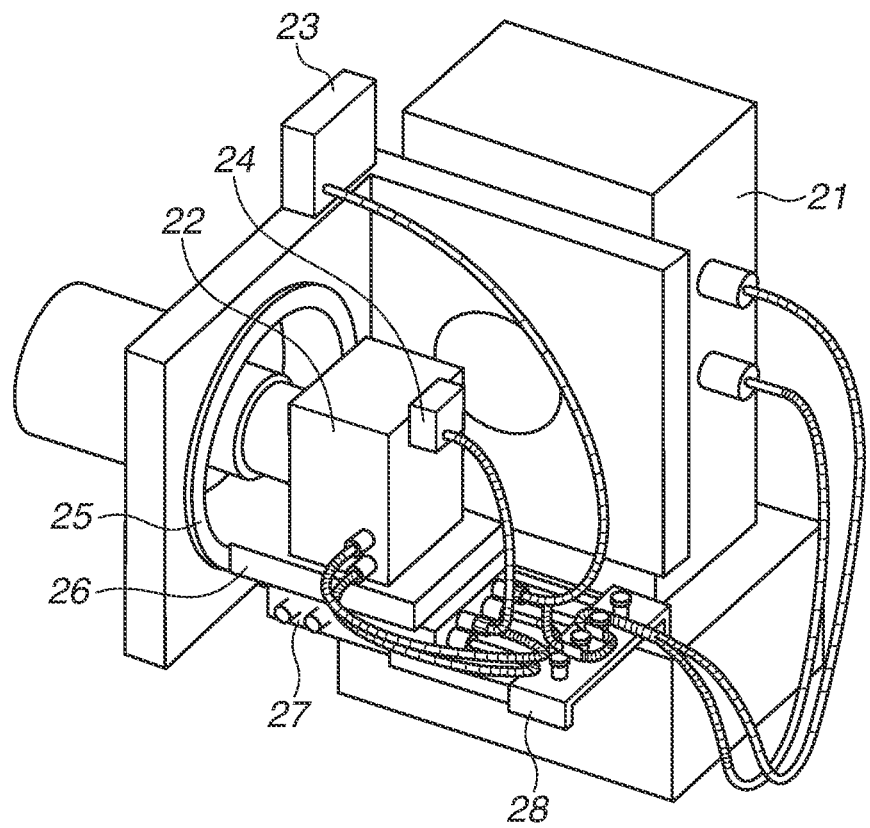
FIG. 5 is a diagram illustrating an example of a case where the main camera and the wide-angle imaging camera according to the first example embodiment are attached to a camera platform so that the cameras perform the panning/tilting rotations about the same rotational axis.

A modification of the example embodiment will be described below with reference to FIG. 5. In the example illustrated in FIG. 1, the wide-angle imaging camera 23 is attached at a position so that the wide-angle imaging camera 23 operates about the same rotational axis as that of the main camera 22 and the finder imaging camera 24 only in the panning operation. In this case, the attachment position of the wide-angle imaging camera 23 may be changed as illustrated in FIG. 5 so that the wide-angle imaging camera 23 may operate about the same rotational axis as that of the main camera 22 and the finder imaging camera 24 in the panning and tilting operations. As another modification, the wide-angle imaging camera 23 may be attached to the lens apparatus 222 so that the wide-angle imaging camera 23 rotates about the same rotational axis as that of the main camera 22 in any of the panning, tilting, and rolling rotation operations.

Referring back to FIG. 2, while the image processing unit 2112 and the communication unit 2113 are configured as units different from the interface CPU 2111, these units may be integrally configured with the interface CPU 2111. In addition, while the image processing unit 2112 has a role of capturing a video image from each of the cameras, the interface CPU 2111 may also have a function of controlling each of the cameras, so that settings of each of the cameras are controllable from the interface CPU 2111.

In addition, while the interface unit 211 outputs video images from the wide-angle imaging camera 23 and the finder imaging camera 24 to the network, either a video image from the finder imaging camera 24 or a video image from the main camera 22 may be selectively output. While zooming control is performed by using the zooming control unit 2122d, control may be performed by using the main camera 22 if the main camera 22 has a zooming control function. While the motor control units 2122 are configured as units different from the drive control CPU 2121, they may be integrally configured with the drive control CPU 2121. In addition, the interface CPU 2111 and the drive control CPU 2121 may be controlled by using one CPU.

The camera stand 26 is a base fixed to the rotator 25 of the camera platform 21. The main camera 22 can be fixed to the camera stand 26. The camera stand 26 rotates in the panning, tilting, and rolling directions with the rotation of the camera platform 21 in the panning, tilting, and rolling directions, respectively.

A detailed configuration of the cable clamp unit 28 according to the first example embodiment of the disclosure will be described below with reference to FIGS. 6A, 6B, and 7.

A distance between connector portions of the control box unit 27 and the camera platform 21 may increase when the panning, tilting, and rolling operations of the main camera 22 are performed. Thus, a cable that is sufficiently long is used for connecting between the connector portions. As a result, the cable can be easily caught, and a connector may be disconnected or damaged at the time of the panning, tilting, and rolling operations. In the camera platform system 20 according to the example embodiment, when the main camera 22 performs the panning operation, the camera platform 21 accordingly performs the panning operation. In this case, the relative positions of the camera platform 21 and the main camera 22 remain unchanged. On the other hand, when the main camera 22 performs the tilting and rolling operations, the camera platform 21 does not rotate. In this case, the relative positions of the camera platform 21 and the main camera 22 change.

Figure 20:
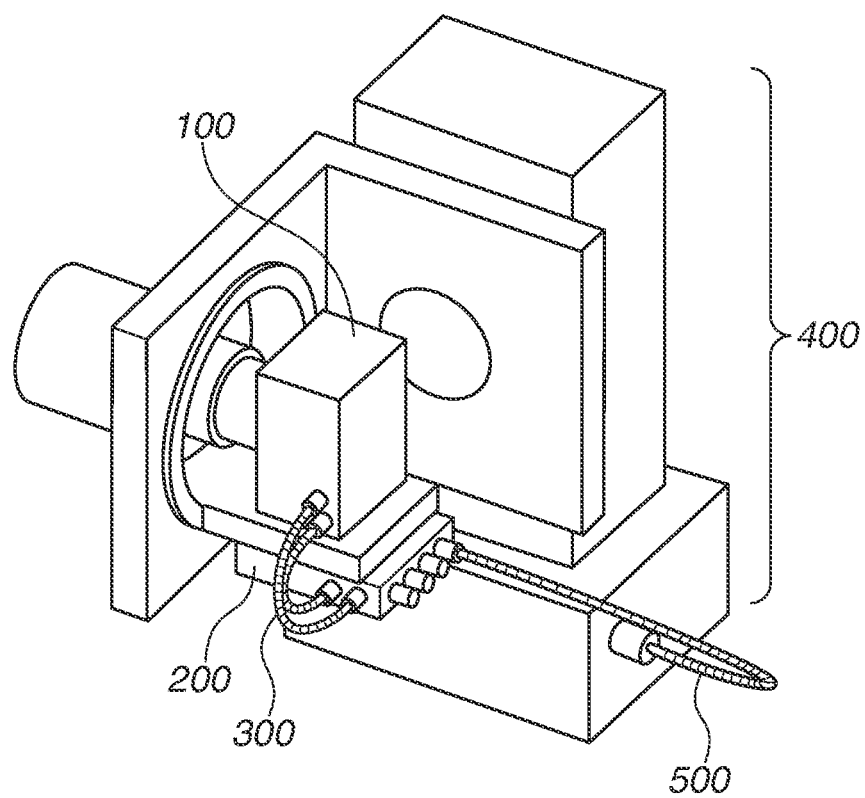
FIG. 20 is a perspective view illustrating a comparative example.
Figure 21:
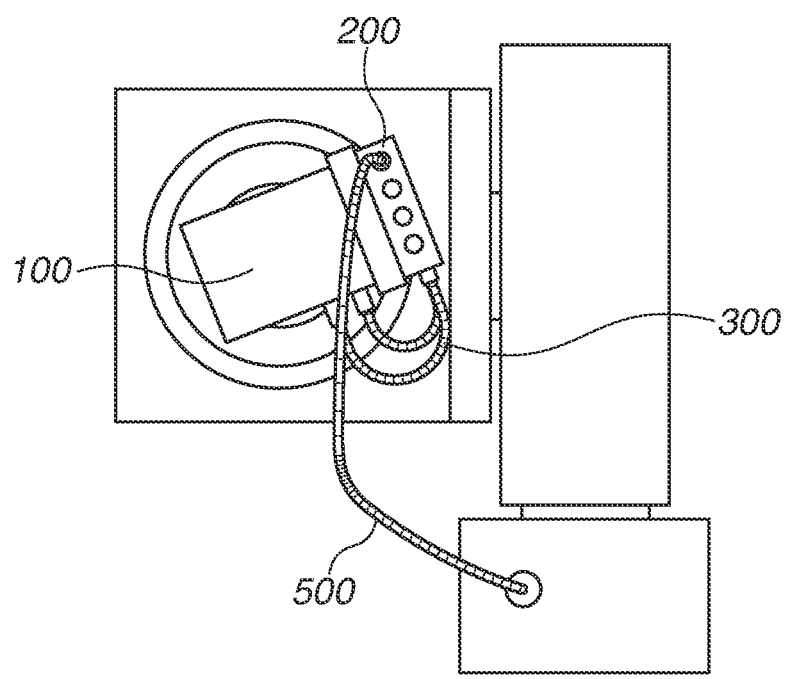
FIG. 21 is a diagram illustrating a state where the main camera is rotated in the comparative example.

FIGS. 20 and 21 illustrate a configuration of a comparative example of the example embodiment. The comparative example differs from the example embodiment (FIGS. 1 and 5) in that the cable clamp unit 28 is not provided. In the comparative example, the main camera 100 and a control box unit 200 are connected with a connector cable (hereinafter simply referred to as a cable) 300, and the control box unit 200 and a camera platform 400 are connected with a cable 500. In FIG. 20, the cable 300 for connecting between the main camera 100 and the control box unit 200 extend in a radial direction on the opposite side of the camera platform 400 and does not interfere with the camera platform 400. However, as illustrated in FIG. 21, when the main camera 100 is rotated in the rolling direction by the camera platform 400, the cable 300 for connecting between the main camera 100 and the control box unit 200 interfere with a part of the camera platform 400. This interference can be avoided if a distance between the camera platform 400 and the rotational axis is increased. However, this raises an issue of an increase in size of the entire camera platform system 20. Thus, in the example embodiment, such an interference between the cable and the camera platform 400 is reduced by providing the cable clamp unit 28 for clamping a connector cable on the rear face of the control box unit 200.

Figure 6A:
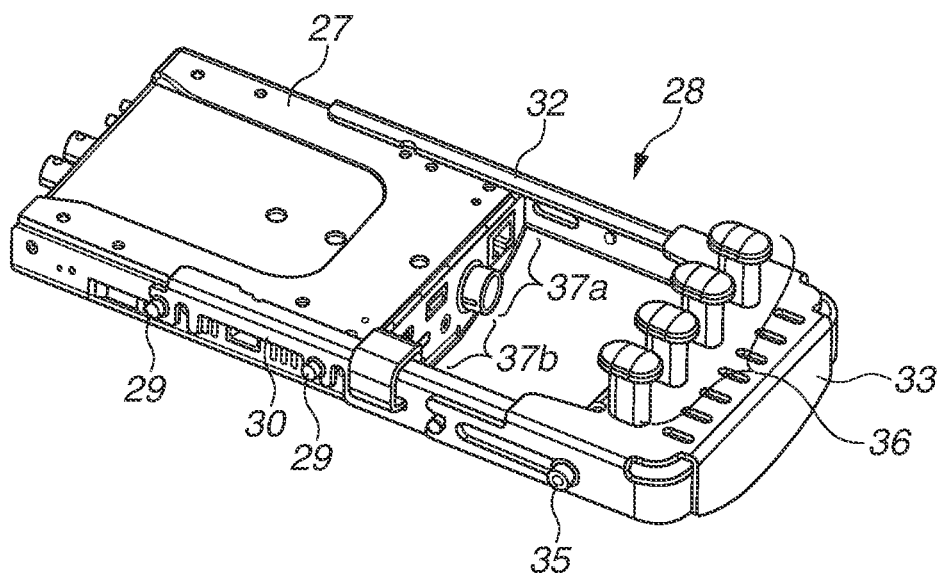
FIGS. 6A and 6B are perspective views illustrating a cable clamp unit according to the first example embodiment.
Figure 6B:
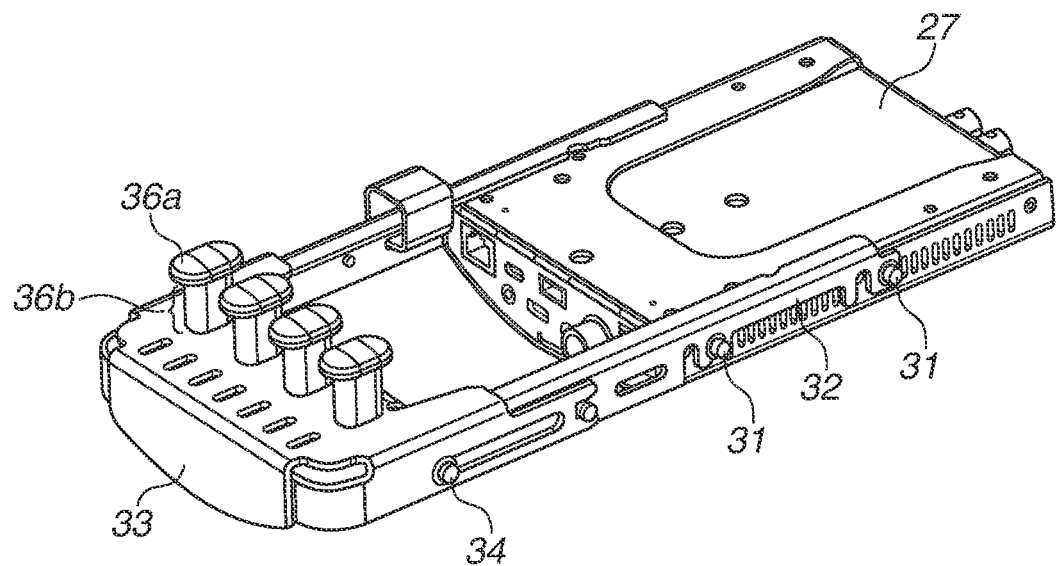

FIGS. 6A and 6B are perspective views illustrating a state where the cable clamp unit 28 is attached to the control box unit 27. FIG. 7 is a top view illustrating the cable clamp unit 28 in a state where a cable is wound.

The cable clamp unit 2$ includes a fixing unit for attaching the cable clamp unit 28 to the control box unit 27, a plurality of column members 36 around which a cable can be wound, and a supporting member (hereinafter referred to as a base unit 33) for supporting the plurality of column members 36.

The fixing unit includes an L-shaped plate 30 attached to one side face of the control box unit 27 with screws 29. The fixing unit also includes an L-shaped plate 32 attached to the opposite side across the control box unit 27 with screws 31. The base unit 33 is movable relative to the plates 30 and 32. One side of the base unit 33 is fitted thereto with a pin 34, and the opposite side is fixed by fastening a screw 35. The base unit 33 can be fixed or released by a user operation. The four column members 36 are formed on the top face of the base unit 33 and are fastened to the base unit 33 from the bottom face with screws (not illustrated).

Each of the column members 36 has a two-step structure in terms of an outer diameter, i.e., a second column portion 36b in contact with the base unit 33, and a first column portion 36a supported by the base unit 33 via the second column portion 36b. The first column portion 36a is larger than the second column portion 36b in at least one of width and depth. The column members 36 having the above-described shape provide a structure for preventing the cable from becoming disconnected. For example, when an orientation of the cable clamp unit 28 changes by 90 degrees after a rotation operation is performed, a clamped cable is likely to be caught by the first column portion 36a and therefore is unlikely to become disconnected. With respect to the column member 36, a height refers to a distance from a surface of the base unit 33 on a column member side to a top face of the first column portion 36a, a width refers to a distance from one end to the other end of the column member 36 in a column member arrangement direction, and a depth refers to a distance from one end to the other end of the column member 36 in a direction perpendicular to the column member arrangement direction. It is desirable that the first column portion 36a is larger than the second column portion 36b in both the width and depth because this structure can further prevent a cable from becoming easily disconnected.

Figure 7:
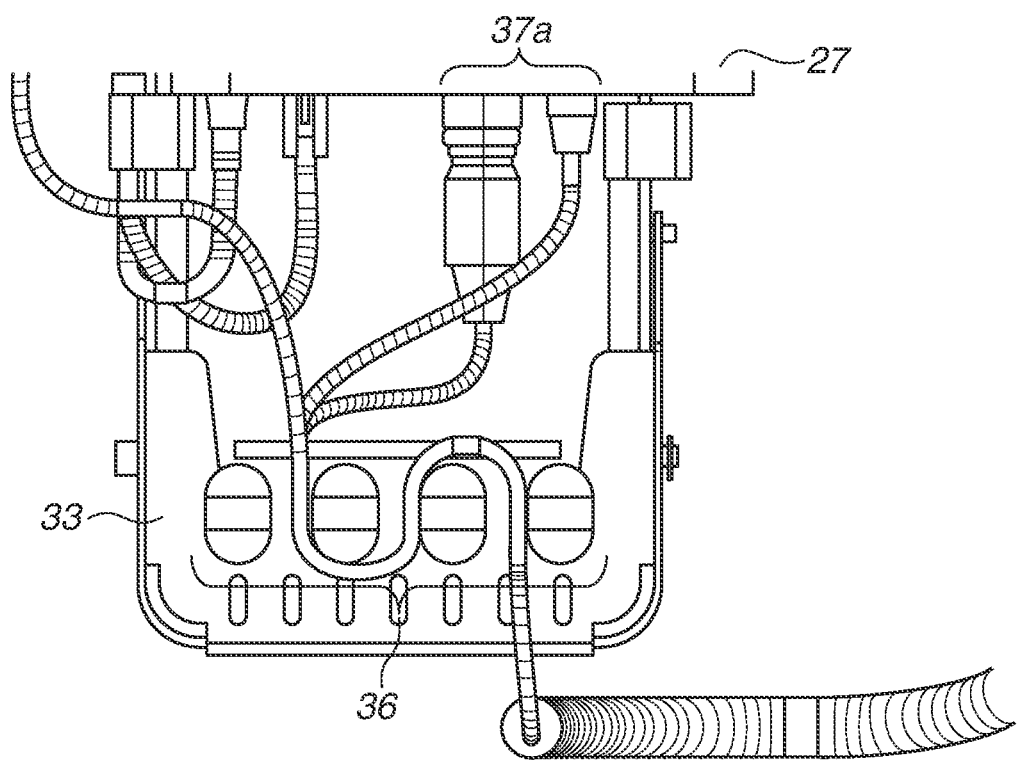
FIG. 7 is a top view illustrating the cable clamp unit with cables according to the first example embodiment.

In the above-described configuration, the cable between the control box unit 27 and the camera platform 21 is wound around the column members 36 as illustrated in FIG. 7. If the cable is suddenly pulled in this state, a pulling force is received by the column members 36. As a result, the force is not directly applied to the connector, whereby damage to the connector can be prevented. In addition, the number of cables can be changed depending on application to be used by the user. Even if the number of cables is increased, this configuration can deal with the increase by stacking the cables from the bottom face side (base unit 33 side) to the top face side around the column members 36, in addition, which ones of the plurality of column members 36 are to be used can be determined based on the cable length. In the case illustrated in FIG. 7, the cable is wound around two of the column members 36. However, all four of or only one of the column members 36 may be used depending on the length of the cable.

Figure 8A:
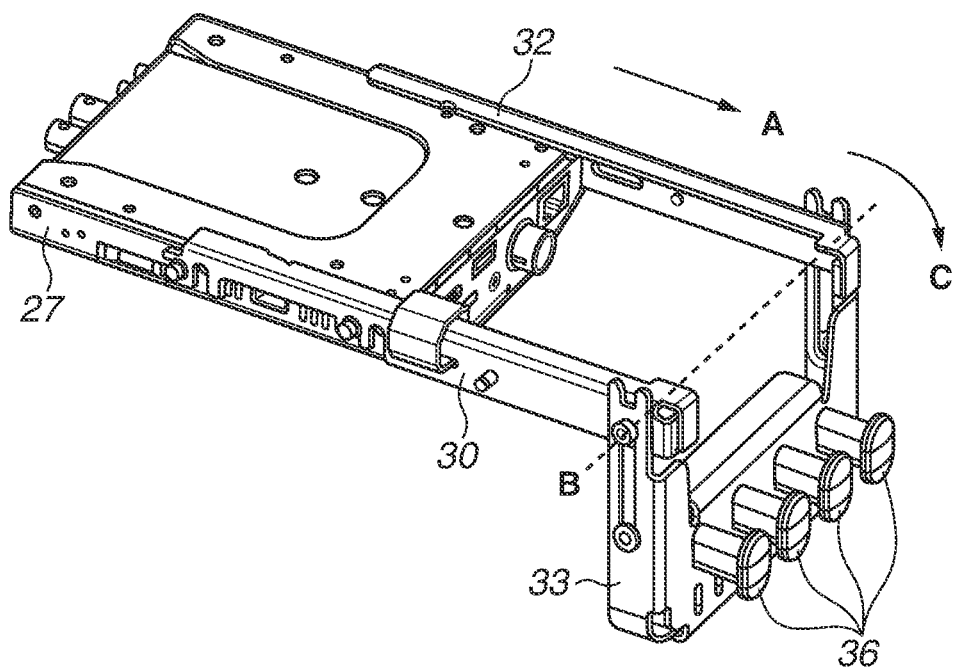
FIGS. 8A and 8B are a perspective view and a rear view, respectively, illustrating the cable clamp unit in an unused state according to the first example embodiment.
Figure 8B:
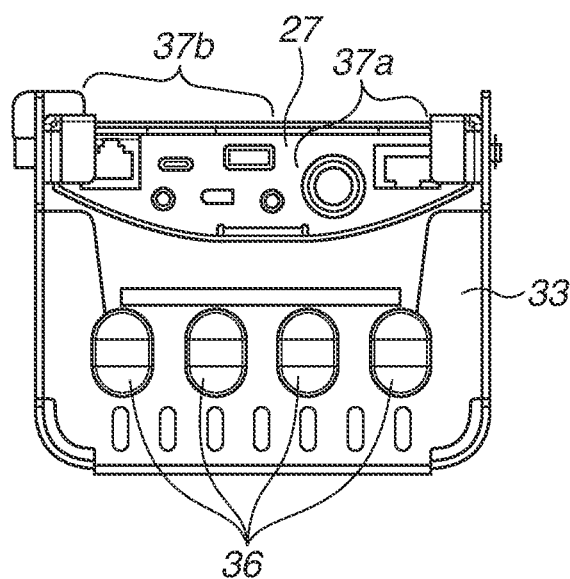

A position of the base unit 33 when the cable clamp unit 28 according to the example embodiment is in use, and the position of the base unit 33 when the cable clamp unit 28 is not in use will be described below with reference to FIGS. 6A, 8A, and 8B. FIGS. 8A and 8B are a perspective view and a rear view, respectively, illustrating the control box unit 27 when the cable clamp unit 28 is not in use, and the cable clamp unit 28.

The base unit 33 of the cable clamp unit 28 is movable relative to the control box unit 27. This configuration makes it possible to change the position of the base unit 33 relative to the control box unit 27 both when the cable is clamped to the cable clamp unit 28 (hereinafter referred to as the used state) and when the cable is not clamped to the cable clamp unit 28 (hereinafter referred to as the unused state). While the cable is being connected to and disconnected from the connector portion of the control box unit 27, i.e., during settings to fix the cable, the cable clamp unit 28 is also considered to be in the unused state.

More specifically, at the position in the used state (when the cable clamp unit 28 is in a first position with respect to the control apparatus), the base unit 33 of the cable clamp unit 28 and the plurality of column members 36 are positioned on the rear face at a predetermined distance from the connector portion of the control box unit 27, as illustrated in FIG. 6A. At the position in the used state, when the camera platform system 20 is viewed from the rear face, a first connector portion 37a provided on the rear face of the control box unit 27 is hidden by the cable clamp unit 28, and therefore each connector is not exposed when viewed from the rear face. In other words, the position in the used state refers to a position where the cable clamp unit 28 overlaps with the first connector portion 37a of the control box unit 27 in the optical axis direction of the main camera 22 (z-axis direction). The first connector portion 37a is a connector portion to which a cable for connecting with the camera platform 21 is connected. A connector portion (second connector portion 37b) to which a cable for connecting with the main camera 22 is connected, which is provided on the rear face of the control box unit 27, is also hidden by the cable clamp unit 28, and therefore each connector is not exposed when viewed from the rear face. In this way, the cable clamp unit 28 is disposed at a position where the cable clamp unit 28 overlaps with the control box unit 27 in the optical axis direction. This structure can prevent an increase in an area of a rotation area in a plane (xy plane) perpendicular to the optical axis even if the cable clamp unit 28 is attached. Thus, the cable clamp unit 28 can be in a position where the cable clamp unit 28 does not interfere with the camera platform 21 during the tilting and rolling operations without increasing the size of the entire apparatus. In addition, at the position in the used state, the cable clamp unit 28 does not interfere with the camera platform 21 even if the camera platform system 20 is operated to perform a combination of a plurality of operations including the panning, tilting, and rolling operations. The rotation area refers to an area that rotates together with the panning, tilting, and rolling operations of the main camera 22 by the camera platform 21. In the example embodiment, the rotation area involves the main camera 22, the camera stand 26, and the control box unit 27. It is desirable that at least a half of a projected area of the cable clamp unit 28 overlaps with the control box unit 27, the camera stand 26, and the main camera 22 in the plane perpendicular to the optical axis. This can prevent an increase in the area of the rotation area. The main camera 22 can be appropriately changed by the user, and the shape of the main camera 22 changes depending on the main camera 22 used. Thus, it is more desirable that at least a half of a projected area the main camera 22 overlaps with the control box unit 27 and the camera stand 26.

To move the cable clamp unit 28 from the position in the used state to the position in the unused state, the base unit 33 at the position in the used state illustrated in FIG. 6A is moved to a position illustrated in FIG. 8A (in a direction of an arrow A) and then rotated in a direction of an arrow C around a rotational axis B. This changes an angle of the base unit 33 with respect to the plates 30 and 32, which constitute the fixing unit. In this way, the base unit 33 is moved to the position in the unused state illustrated in FIGS. 8A and 8B.

The position in the unused state (when the cable clamp unit 28 is in a second position with respect to the control apparatus) refers to a position at which the first connector portion 37a provided on a housing of the control box unit 27 is exposed when the camera platform system 20 is viewed from the rear face as illustrated in FIGS. 8A and 8B. In other words, in the unused state, the cable clamp unit 28 does not overlap with the first connector portion 37a of the control box unit 27 in the optical axis direction of the main camera 22.

At the position in the unused state, the base unit 33 has moved to a position where the base unit 33 does not hinder operations of connecting and disconnecting a connector, thereby ensuring smooth connection and disconnection of the connector. At the position in the unused state, when the camera platform system 20 is operated to perform the combination of the plurality of operations including the panning, tilting, and rolling operations, the cable clamp unit 28 may interfere with the camera platform 21. This is because it is assumed that the panning, tilting, and rolling operations are not performed at the position in the unused state. In FIGS. 8A and 8B, the cable clamp unit 28 is retracted to a position where the connector portion of the control box unit 27 do not fully overlap with the cable clamp unit 28 in the optical axis direction. However, if 70 percent or more of an area of each connector to be connected with the camera platform 21 is exposed on the rear face, the cable clamp unit 28 hardly hinders the connection and disconnection operations. Thus, an interfered area is to be less than 30 percent of the area of each connector.

As described above, the cable clamp unit 28 having the plurality of column members 36 is disposed between the camera platform 21 and the control box unit 27. Even if a cable is caught at the time of the panning, tilting, and rolling operations, this configuration makes it possible to reduce a possibility of disconnection of each connector or damage to each connector. This configuration can also deal with a change in the number of cables.

In addition, the cable clamp unit 28 can be in a position where the cable clamp unit 28 does not overlap with the first connector portion 37a of the control box unit 27 in the optical axis direction. This ensures smooth cable connection and disconnection to and from the first connector portion 37a even if a distance is short between the control box unit 27 and the cable clamp unit 28 in the optical axis direction.

If the cable clamp unit 28 has a first state where the cable clamp unit 28 overlaps with the first connector portion 37a in the optical axis direction, and a second state where the cable clamp unit 28 does not overlap with the first connector portion 37a, the rotation area rotating together with the main camera 22 can be reduced when the camera platform system 20 is viewed from the optical axis direction. In this case, in particular, the camera platform system 20 in which the main camera 22 rotates in the rolling direction can be reduced in size. The cable clamp unit 28 is located within an inner side of an external form of the rotator 25 when the camera platform system 20 is viewed from the optical axis. This also makes it possible to reduce a possibility that a cable clamped to the cable clamp unit 28 comes into contact with an object outside the camera platform system 20.

In the second state, a large distance to the first connector portion 37a can be maintained, and the cable clamp unit 28 can be retracted in a direction different from an extension direction of the connector, whereby the cable can be smoothly connected to and disconnected from the connector in the unused state.

A configuration of the control box unit 27 will be described below. The control box unit 27 can translate communication between the main camera 22 and the camera platform 21 and can include a circuit or a processor. When a control instruction such as a release control instruction and a focus control instruction to the main camera 22 is input from the operation unit 10, the instruction is input to the main camera 22 via the camera platform 21 and the control box unit 27. An image captured by the main camera 22 is output to a display unit (not illustrated) via the control box unit 27 and the camera platform 21. The control box unit 27 is fixed to the camera stand 26 and rotates together with the rotation of the main camera 22 in the panning, tilting, and rolling directions.

Figure 9:
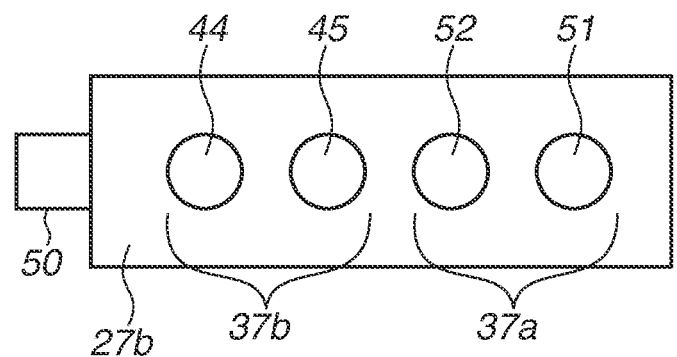
FIG. 9 is a rear view illustrating a control box unit.
Figure 10:
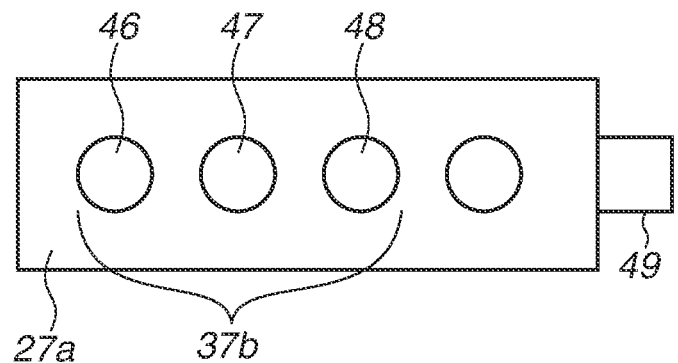
FIG. 10 is a front view illustrating the control box unit.
Figure 11:
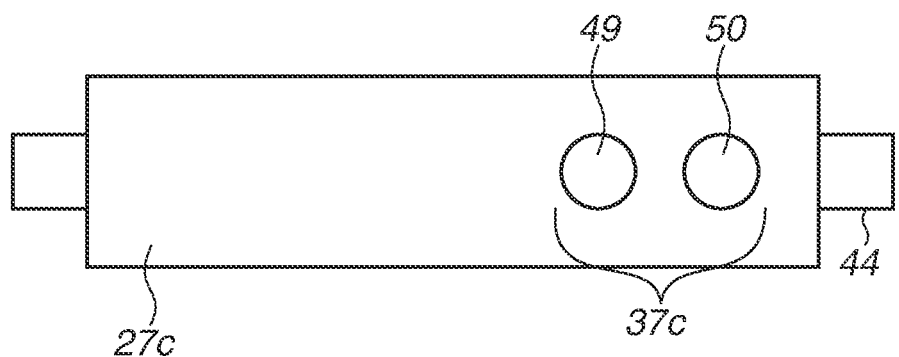
FIG. 11 is a side view illustrating the control box unit.

Arrangement of electrical connectors on the control box unit 27 according to the example embodiment will be described below with reference to FIGS. 9 to 11. FIGS. 9 to 11 illustrate the control box unit 27 illustrated in FIG. 1, extracted and expressed in a simplified way. FIGS. 9, 10, and 11 are a rear view, a front view, and a side view, respectively, illustrating the control box unit 27. The control box unit 27 includes the electrical connectors for connecting with external apparatuses on a front face 27a, a rear face 27b, and a side face 27c.

The rear face 27b of the control box unit 27 includes various electrical connectors for connecting with the main camera 22 and various electrical connectors for connecting with the camera platform 21 as illustrated in FIG. 9. Of the electrical connectors provided on the rear face 27b, the electrical connectors for connecting with the main camera 22 are provided on an assumption that the main camera 22 is a camera for mainly capturing a still image, represented by a single lens reflex camera and a mirror-less single-lens reflex camera. More specifically, the electrical connectors for connecting with the main camera 22 include an electrical connector 44 for a communication cable for changing settings of the camera, and an electrical connector 45 for a communication cable for transmission and reception of captured image data. These electrical connectors are arranged on the left side of the rear face 27b. This connector arrangement is made in consideration of cable routing. In a case where the main camera 22 is a single-lens reflex camera or a mirror-less single-lens reflex camera, i.e., a still camera, the connectors for connecting with external apparatuses are often arranged on the left-hand side of the main camera 22 when viewed from the rear face as illustrated in FIG. 1. In a case where the main camera 22 is a still camera such as a single-lens reflex camera and a mirror-less single-lens reflex camera, the connectors for connecting with external apparatuses are often arranged on the left-hand side since a holding grip is formed on the right-hand side. As illustrated in FIG. 1, in a case where the wide-angle imaging camera 23 and the finder imaging camera 24 are configured in addition to the main camera 22, the electrical connectors for connecting with these cameras are formed on the rear face 27b although the connectors are omitted in FIG. 9. The electrical connectors are provided on the right-hand side (more on the side of the camera platform 21) of the electrical connectors 44 and 45, which are used for the connection with the main camera 22.

Connectors for connecting with the camera platform 21 are arranged on the right-hand side on the rear face 27b. More specifically, the connectors include an electrical connector 51 for a power supply cable and an electrical connector 52 for a data communication cable. As illustrated in FIG. 1, in consideration of cable routing, it is desirable that the electrical connectors 51 and 52 are arranged on the side of the camera platform 21 (the right-hand side according to the example embodiment). In the example embodiment, the electrical connectors 51 and 52 are arranged on the rear face 27b, but they may be arranged on the front face 27a.

Likewise, as illustrated in FIG. 10, various electrical connectors for connecting with the main camera 22 are also arranged on the front face 27a of the control box unit 27. The electrical connectors are provided on an assumption that the main camera 22 is a camera for mainly capturing a moving image such as a video camera. More specifically, the electrical connectors include a connector 46 for a communication cable for transmission and reception of a time code signal, a connector 47 for a communication cable for transmission and reception of a video image synchronization signal, and a connector 48 for a communication cable for transmission and reception of a control signal for remotely controlling a camera. Electrical connectors arranged on the rear face 27b and the front face 27a may be provided on an assumption that is opposite to the above-described one with respect to the main camera 22. More specifically, electrical connectors to be connected with a moving image camera are gathered on the rear face 27b, and electrical connectors to be connected with a still image camera are gathered on the front face 27a.

As illustrated in FIG. 11, the side face 27c of the control box unit 27 includes a connector 49 for monitor output and a connector 50 for service maintenance. These connectors are electrical connectors (third connector portion 37c) not connected with the main camera 22 or the camera platform 21 at the time of normal image capturing but connected with external apparatuses other than the main camera 22 and the camera platform 21.

In the above-described configuration, all of the connectors connected with the main camera 22 via the control box unit 27 and the connectors connected with the camera platform 21 via the control box unit 27 at the time of normal image capturing are gathered on the rear face 27b and the front face 27a. Thus, the electrical connectors 44 to 48 for connecting with the main camera 22 are arranged so that, when a cable is connected to each of the electrical connectors, the cable extends in the optical axis direction of the main camera 22. Since the connected cable is unlikely to extend in the radial direction with respect to the rolling rotational axis, the cable does not interfere with the fixed wall even if the main camera 22 is rolled during image capturing.

According to the example embodiment, all of the electrical connectors 44 to 48 for connecting with the main camera 22 are arranged on the front face 27a or the rear face 27b. However, if there are many electrical connectors for connecting with the main camera 22 so that the electrical connectors cannot be gathered on the front face 27a and the rear face 27b, the electrical connectors provided on an assumption that the main camera 22 is a camera for mainly capturing a moving image are disposed on the side face 27c. Then, the electrical connectors for connecting with a still camera are gathered on the front face 27a, the rear face 27b, or both. This is because a still camera is rolled more often than a video camera is.

Figure 12:
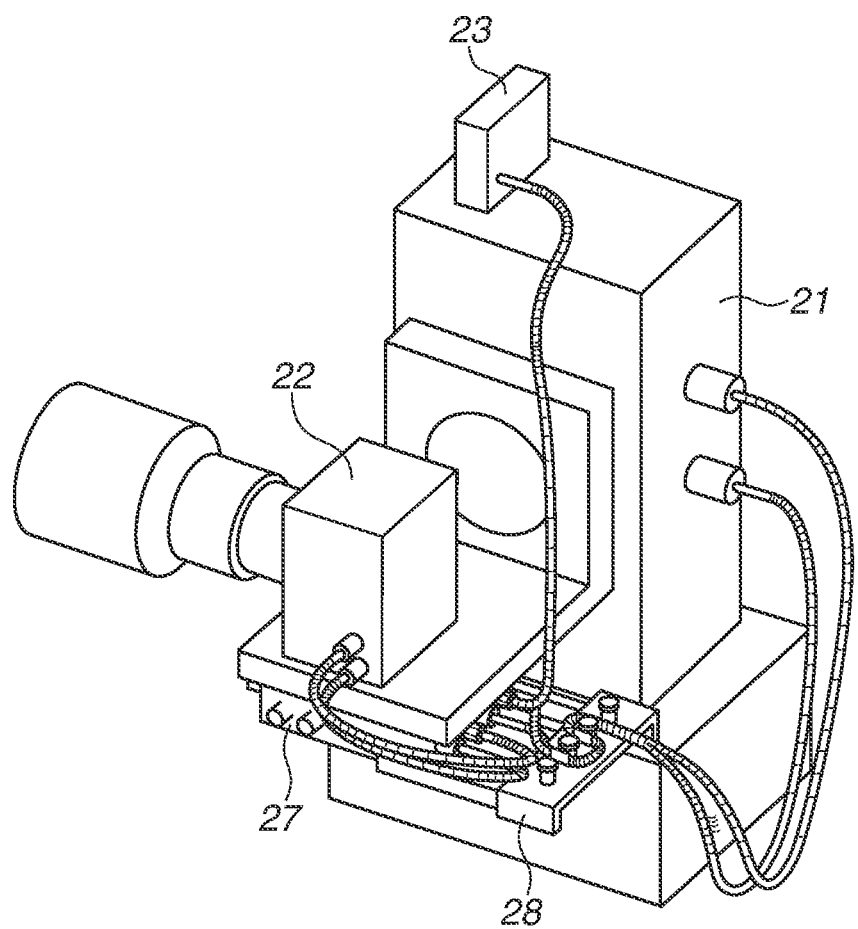
FIG. 12 is a perspective view illustrating a second example embodiment.
Figure 13:
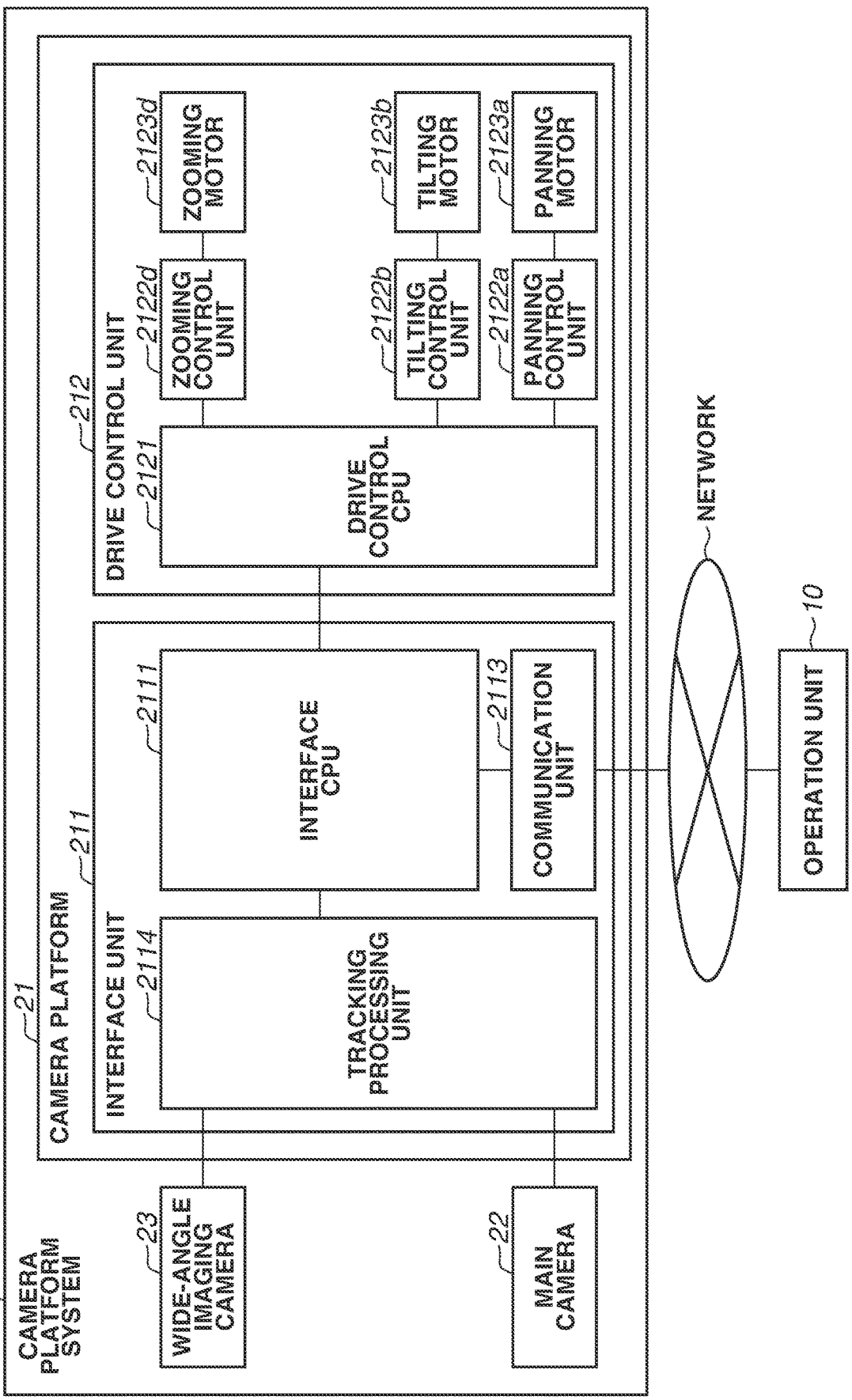
FIG. 13 is a block diagram illustrating the second example embodiment.

A configuration according to a second example embodiment of the disclosure will be described below with reference to a perspective view illustrated in FIG. 12 and a block diagram illustrated in FIG. 13. The second example embodiment performs a tracking operation by using a video camera for moving image capturing as the main camera 22. As compared with the configuration according to the first example embodiment illustrated in FIGS. 1 and 2, the finder imaging camera 24, the rolling control unit 2122c, and the rolling motor 2123c are deleted from the configuration according to the example embodiment illustrated FIGS. 12 and 13. Although a possibility of rolling the main camera 22 is low in moving image capturing as described above, the main camera 22 may also be configured to be rolled as in the first example embodiment.

A tracking processing unit 2114 is configured instead of the image processing unit 2112. The tracking processing unit 2114 recognizes a tracking target subject based on video images of both the main camera 22 and the wide-angle imaging camera 23 and calculates the position of the subject in an image. Unless otherwise noted, other configurations are similar to those of the first example embodiment.

Processing performed by the interface CPU 2111 at the time of subject tracking will be described below with reference to the flowchart illustrated in FIG. 14.

In step S101, the interface CPU 2111 requests the tracking processing unit 2114 to acquire the subject's position in the wide-angle imaging camera 23. If the interface CPU 2111 acquires the subject's position (YES in step S101), the processing proceeds to step S102. If the interface CPU 2111 cannot acquire the subject's position (NO in step S101), the processing ends.

In step S102, the interface CPU 2111 acquires the current panning, tilting, and zooming positions from the drive control CPU 2121. Then, the processing proceeds to step S103. In step S103, the interface CPU 2111 calculates a target position based on the subject's position and the current panning, tilting, and zooming positions. Then, the processing proceeds to step S104. In step S104, the interface CPU 2111 notifies the drive control CPU 2121 of the calculated target position and drives panning, tilting, and zooming to track the subject.

Figure 15:
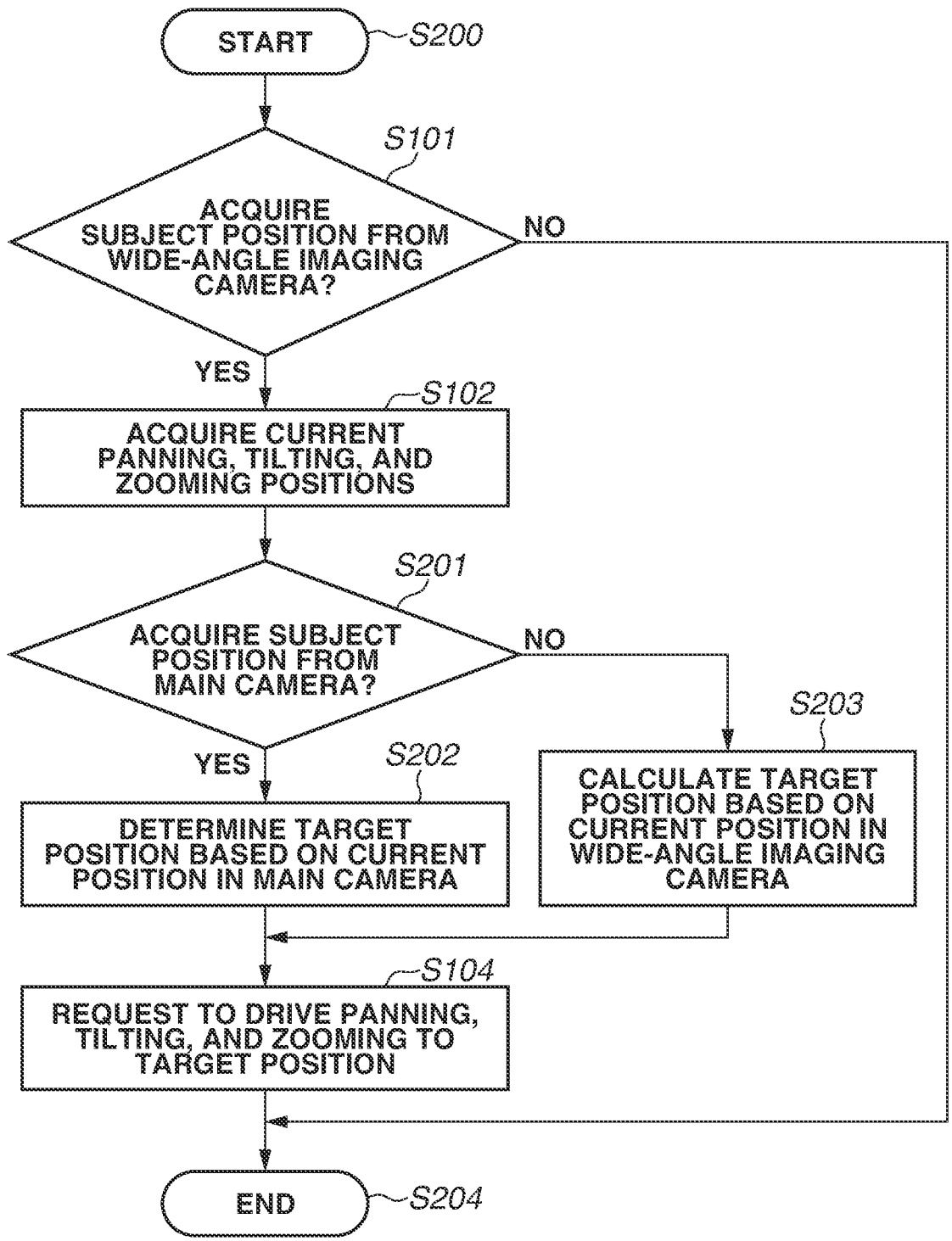
FIG. 15 is a flowchart illustrating processing of the interface CPU at the time of tracking using video cameras as a main camera and the wide-angle imaging camera according to the second example embodiment.

Although a tracking operation can be performed by using the wide-angle imaging camera 23 as described above, a video image of the video camera as the main camera 22 is also usable. Processing performed by the interface CPU 2111 in a case where a video image of the video camera in addition to a video image of the wide-angle imaging camera 23 are used for the tracking operation will be described below with reference to the flowchart illustrated in FIG. 15.

Figure 14:
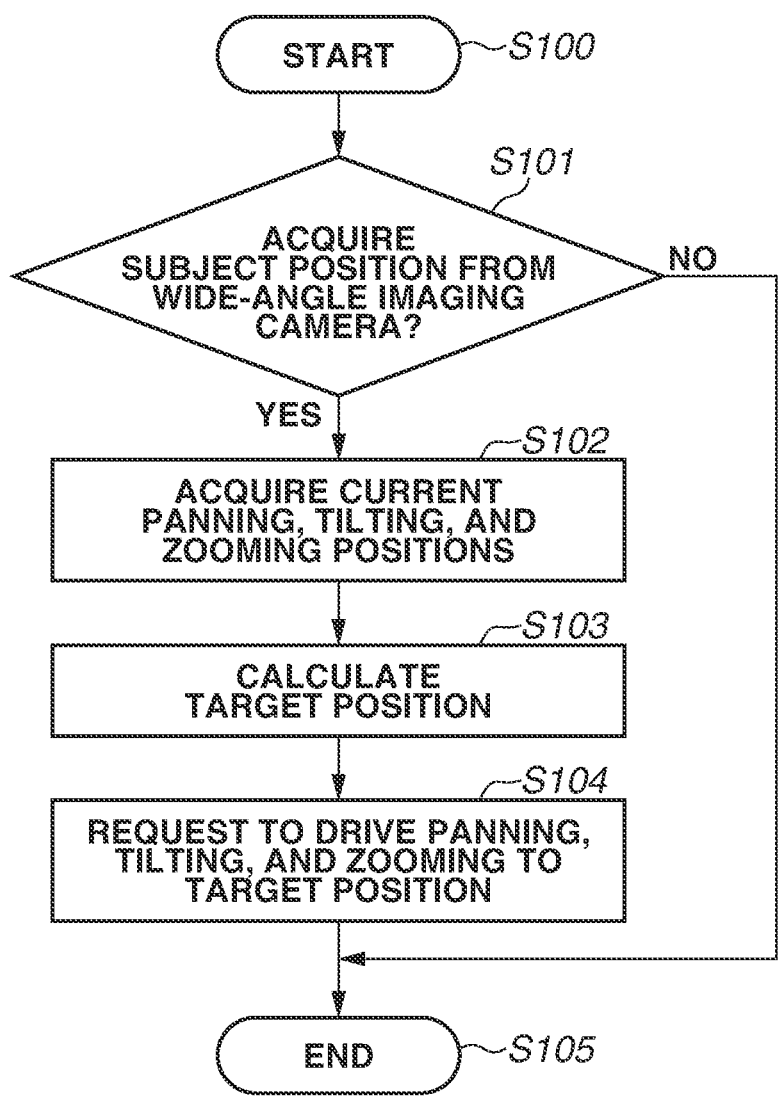
FIG. 14 is a flowchart illustrating processing of an interface central processing unit (CPU) at the time of tracking using a wide-angle imaging camera according to the second example embodiment.

Similar to the flowchart in FIG. 14, the interface CPU 2111 performs the processing in steps S101 and S102. If the interface CPU 2111 can acquire the subject's position in the wide-angle imaging camera 23 (YES in step S101), the processing proceeds to step S201. If the interface CPU 2111 cannot acquire the subject's position (NO in step S101), the processing ends.

In step S201, the interface CPU 2111 requests the tracking processing unit 2114 to acquire the subject's position in the main camera 22. If the interface CPU 2111 acquires the subject's position (YES in step S201), the processing proceeds to step S202. If the interface CPU 2111 cannot acquire the subject's position (NO in step S201), the processing proceeds to step S203. In step S202, the interface CPU 2111 determines a target position based on the acquired subject's position in the main camera 22. Then, the processing proceeds to step S104. In step S203, the interface CPU 2111 determines a target position based on the acquired subject's position in the wide-angle imaging camera 23. Then, the processing proceeds to step S104. In step S104, the interface CPU 2111 performs similar processing to the processing illustrated in FIG. 14 to track the subject. More specifically, the interface CPU 2111 functions as a subject recognition unit to recognize the subject based on the video images of both the main camera 22 and the wide-angle imaging camera 23 and then perform a tracking operation based on a result of the subject recognition.

As described above, in the camera platform system 20 in which the main camera 22 and the wide-angle imaging camera 23 cooperate with each other to perform a tracking operation aiming at an improvement of the tracking performance and ease of matching the image capture timing, influences of misalignment during rotation can be eliminated by rotating these cameras about the same rotational axis. Thus, complicated correction or cooperation is not necessary, and the purpose can be achieved with a simpler system.

In the example embodiment, the tracking processing unit 2114 is configured instead of the image processing unit 2112; however, the two units may be provided as different units or integrally configured with the interface CPU 2111 as a single component.

In the flowchart illustrated in FIG. 14, the interface CPU 2111 ends the tracking operation if a subject cannot be recognized by the wide-angle imaging camera 23; however, the interface CPU 2111 may confirm subject recognition processing of the main camera 22 in this case. In addition, in the flowchart, priority is given to the main camera 22 if the subject is recognized by the main camera 22; however, the cameras may be switched depending on a condition.

A configuration of a third example embodiment of the disclosure differs from the configuration of the first example embodiment in the shape of the cable clamp unit. Unless otherwise noted, other configurations according to the third example embodiment are similar to those of the first example embodiment.

Figure 16A:
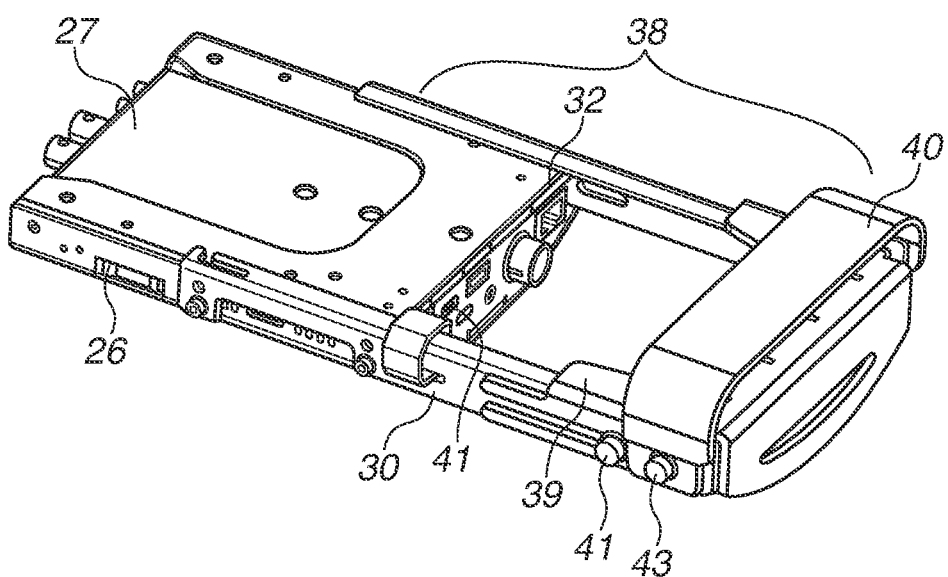
FIGS. 16A and 16B are a perspective view and a rear view, respectively, illustrating a cable clamp unit according to a third example embodiment.
Figure 16B:
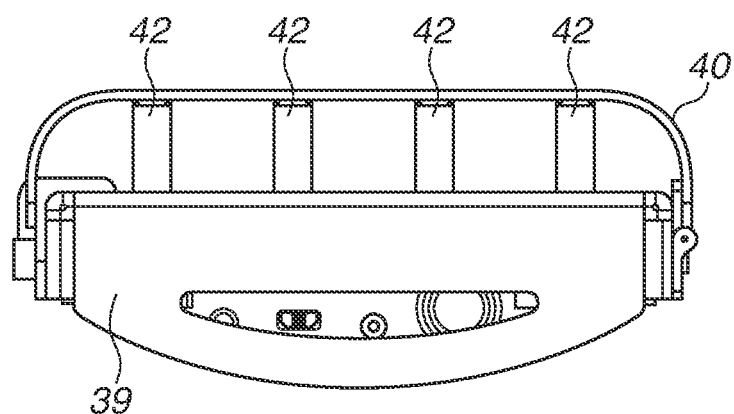
Figure 17:
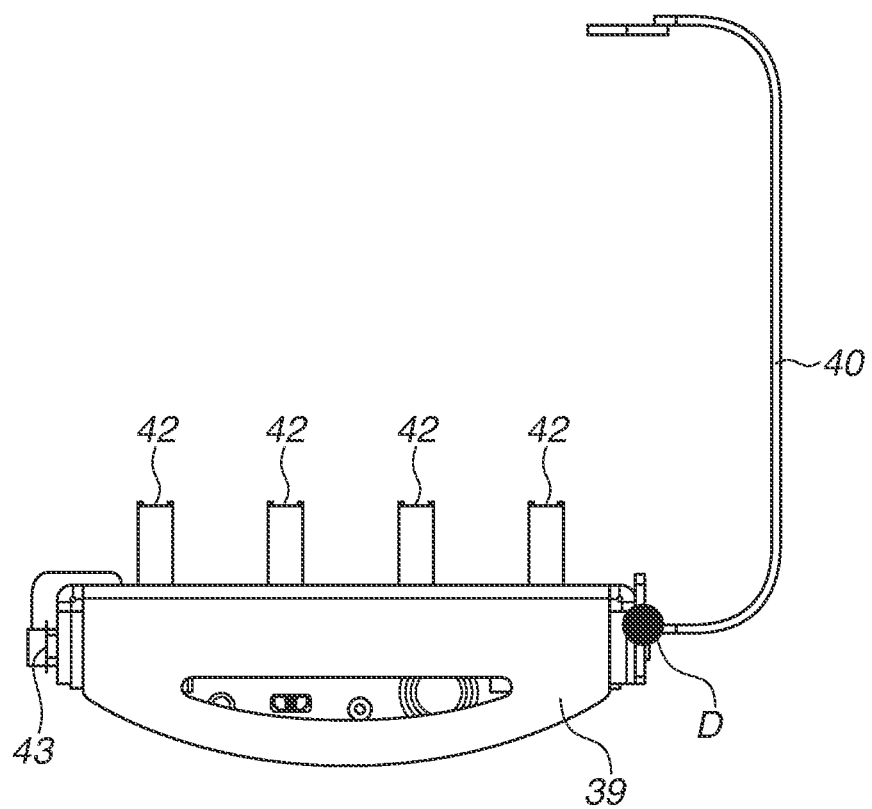
FIG. 17 is a rear view illustrating the cable clamp unit in an unused state according to the third example embodiment.
Figure 18:
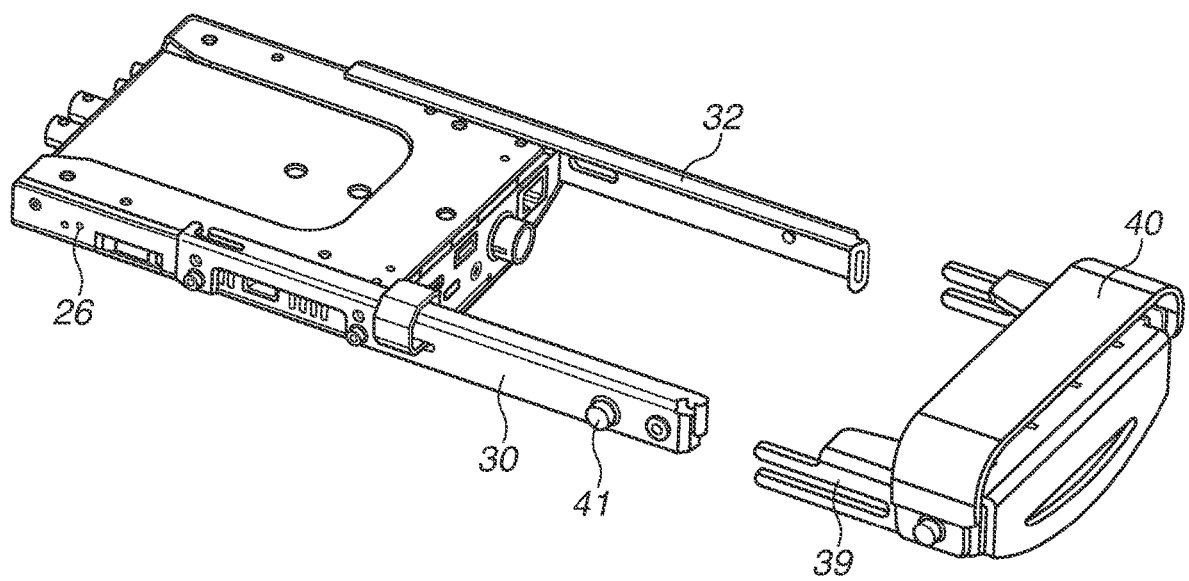
FIG. 18 is a perspective view illustrating the cable clamp unit in the unused state according to the third example embodiment.

The configuration of a cable clamp unit 38 according to the example embodiment will be described below with reference to FIGS. 16A, 16B, 17, and 18. FIG. 16A is a perspective view illustrating a state where the cable clamp unit 38 is attached to the control box unit 27. FIG. 16B is a rear view illustrating the cable clamp unit 38 attached to the control box unit 27. FIG. 17 is a rear view illustrating a state where a top face cover is rotated. FIG. 18 is a perspective view illustrating a state where a base unit 39 of the cable clamp unit 38 is detached.

Similar to the configuration of the first example embodiment, the cable clamp unit 38 according to the example embodiment maintains its position by being attached to the control box unit 27. The cable clamp unit 38 includes a fixing unit for mainly attaching the cable clamp unit 38 to the control box unit 27, a plurality of column members 42 around which a cable can be wound, the base unit 39 for supporting the plurality of column members 42, and a top face cover 40.

The fixing unit includes plates 30 and 32 similar to the first example embodiment. The base unit 39 is attached to the plates 30 and 32 so as to be detachable by removing a screw 41. Four column members 42 are formed on the top face of the base unit 39 and are fastened to the base unit 39 from the bottom face with screws (not illustrated).

The column members 42 differs from the column members 36 according to the first example embodiment in that none of them has the two-step structure in terms of the outer diameter. Since the first column portions 36a are not provided, the cable is likely to come off from the column members 42. Thus, the top face cover 40 can be disposed on the top faces of the column members 42. By disposing the top face cover 40 so as to overlap with the column members 42 in a height direction of the column members 42, the cable is unlikely to be disconnected even if the orientation of the control box unit 27 changes. By releasing fixation of the screw 43, the top face cover 40 can be rotated around the Z axis about a rotational axis D, as illustrated in FIG. 17. With this configuration, when winding the cable around the column members 42 or removing the cable therefrom, the top face cover 40 can be retracted so as not to overlap with the column members 42 in the height direction. The plurality of column members 42 is supported by the base unit 39 similar to the first example embodiment. Thus, a load on a connector can be reduced even if the cable is suddenly pulled, while it is possible to deal with the variation in the number and length of cables to be clamped.

Positions of the base unit 39 in a used state and an unused state where the cable clamp unit 38 according to the example embodiment is used and unused, respectively, will be described below with reference to FIGS. 16A, 16B, 17, and 18. The base unit 39 according to the example embodiment is attachable to and detachable from the plates 30 and 32, which constitute the fixing unit. When the fixing unit is detached, the base unit 39 can be changed from the position in the used state to the position in the unused state of the cable clamp unit 38.

FIG. 16A illustrates the position in the used state of the cable clamp unit 38. Similar to the first example embodiment, in the used state, the base unit 39 and the plurality of column members 42 of the cable clamp unit 38 are positioned on the rear face 27b of the control box unit 27, with a predetermined distance from a connector portion of the cable clamp unit 38. Thus, similar to the first example embodiment, in the used state, the first connector portion (portion where the electrical connectors 51 and 52 are disposed) of the control box unit 27 is hidden by the cable clamp unit 38, and therefore the electrical connectors are not exposed when the camera platform system 20 is viewed from the rear face. The top face cover 40 presses the column members 42 from above, as illustrated in FIG. 16B, reducing a possibility that the cable comes off when the camera platform 21 is in use. While the top face cover 40 is in contact with the column members 42 in FIG. 16B, the top face cover 40 does not need to be in contact with the column members 42. If a gap between the top face cover 40 and the column members 42 is less than or equal to the cable diameter, the possibility that the cable comes off can be sufficiently reduced. Thus, it is desirable that the gap between the top face cover 40 and the column members 42 is about 1 mm or less.

To move the base unit 39 from the position in the used state to the position in the unused state, first, fixation with the screw 43 is released so that the top face cover 40 can be rotated around the Z axis about the rotational axis D, as illustrated in FIG. 17, and the cable can be removed. After the cable is removed, the screw 41 is removed as illustrated in FIG. 18. Then, the base unit 39 is slid toward the rear face and detached from the plates 30 and 32. At the position in the unused state, the base unit 39 has been detached from the plates 30 and 32 when connecting and disconnecting the connectors, and therefore the connectors are exposed when viewed from the rear face. In other words, the cable clamp unit 38 does not overlap with the first connector portion of the control box unit 27 in the optical axis direction of the main camera 22. Thus, the connectors can be smoothly connected and disconnected, similar to the first example embodiment.

A configuration according to a fourth example embodiment of the disclosure differs from the configuration according to the first example embodiment in that the control box unit 27 is not provided and the cable clamp unit 28 is attached to the camera stand 26. Unless otherwise noted, other configurations are similar to those of to the first example embodiment.

Figure 19:
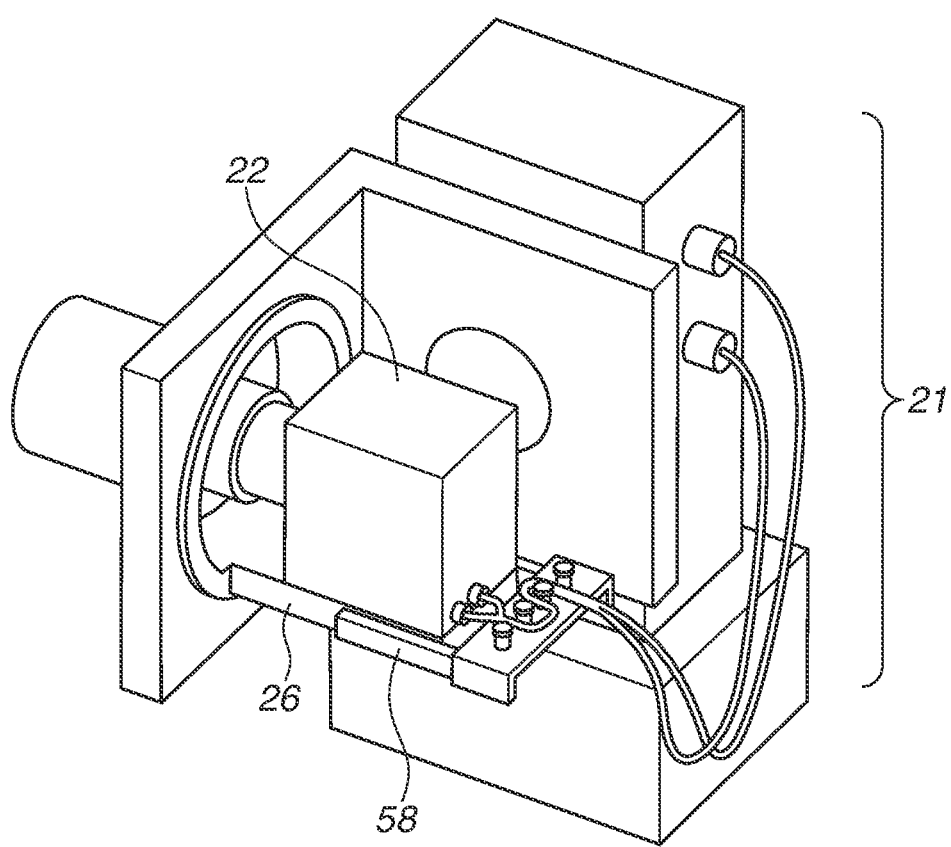
FIG. 19 is a perspective view illustrating a fourth example embodiment.

The configuration of the fourth example embodiment will be described below with reference to FIG. 19. FIG. 19 is a perspective view illustrating the entire camera platform system 20 according to the example embodiment. As described above, in the camera platform system 20 according to the example embodiment, the main camera 22 and the camera platform 21 are directly connected with each other with a cable since the control box unit 27 is not provided. If the main camera 22 and the camera platform 21 are configured to directly communicate with each other, the control box unit 27 can be omitted as in the example embodiment.

Even in the camera platform system 20 not including the control box unit 27 as in the example embodiment, it is necessary that the cable that is sufficiently long is used since a relative positional relation between the camera platform 21 and the main camera 22 may be changed by the panning, tilting, and rolling operations. Thus, even if interference of the cable 300 as illustrated in FIG. 21 does not occur, the cable may be easily caught at the time of the panning, tilting, and rolling operations, and a connector may be disconnected or damaged.

Thus, according to the example embodiment, a cable clamp unit 58 is attached to the camera stand 26, making it possible to clamp the cable for connecting between the main camera 22 and the camera platform 21. By attaching the cable clamp unit 58 to the camera stand 26 that performs the panning, tilting, and rolling operations together with the main camera 22, a load applied to the connector portion on the camera side can be reduced even if the cable is caught by something during the panning, tilting, and rolling operations. The configuration of the cable clamp unit 58 is similar to that according to the first example embodiment, whereby detailed descriptions thereof will be omitted. As in the first example embodiment, since the base unit 33 is movable relative to the camera stand 26, the base unit 33 can be in a position (second state) where the electrical connector portion usable for connection with the camera platform 21, provided on the main camera 22, is exposed on the rear face.

Example Modifications

In the above-described example embodiments, the camera platform 21 performs the panning operation together with the panning operation of the main camera 22 to leave a relative positional relation unchanged. The relative position between the camera platform 21 and the main camera 22 changes with the tilting and rolling operations of the main camera 22. However, the disclosure is not limited thereto. Depending on the positional relation between the camera platform 21 and the main camera 22, the camera platform 21 does not have to perform the panning operation even if the main camera 22 performs the panning operation, and the camera platform 21 may perform the tilting and rolling operations together with the tilting and rolling operations of the main camera 22, respectively. However, the disclosure provides higher effects if the above-described cable clamping and electrical connector arrangements are performed in the camera platform system 20 in which the relative position between the main camera 22 and the camera platform 21 is changed by at least one of the panning, tilting, and rolling operations of the main camera 22.

The cable clamp unit is attached to the rear face of the control box unit 27 or the camera stand 26 in the above-described example embodiments; however, the cable clamp unit may be attached to a front face thereof if the electrical connector (in the first and second connector portions) to which the cable to be clamped is connected is arranged on the front face. Also in this case, a similar configuration to those according to the above-described example embodiments enables the cable clamp unit to be in a state (second state) where the cable clamp unit does not overlap with the connector portion of the control apparatus in the optical axis direction of the main camera 22.

In the above-described example embodiments, while the cable clamp unit is configured to be attachable to and detachable from the control box unit 27 or the camera stand 26 with a screw, the cable clamp unit may also be integrally configured with the control box unit 27 or the camera stand 26. In this case, at least the fixing unit of the cable clamp unit is integrally configured with the control box unit 27 or the camera stand 26.

While the disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

Other Example Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2018-205865, filed Oct. 31, 2018, which is hereby incorporated by reference herein in its entirety.

What is claimed is:

1. A camera platform system comprising:
   a fixing base configured to fix an imaging apparatus;
   a camera platform configured to rotate the imaging apparatus fixed to the fixing base in at least one of the panning, tilting, and rolling directions;
   a control apparatus configured to control the imaging apparatus;
   a clamp unit attached to the control apparatus and configured to clamp a connector cable for connecting between the control apparatus and the camera platform; and
   a fixing unit configured to attach the clamp unit to the control apparatus,
   wherein the control apparatus includes a first connector portion to which a connector cable for connecting to the camera platform is connected,
   wherein the clamp unit includes a plurality of column members and a supporting member for supporting the plurality of column members,
   wherein the fixing unit fixes the supporting member to the control apparatus, and
   wherein the clamp unit can be in a state where the clamp unit does not overlap with the first connector portion of the control apparatus in an optical axis direction.

2. The camera platform system according to claim 1,
   wherein the clamp unit can be in a first position and a second position,
   wherein the first position is a position where at least a part of the clamp unit overlaps with at least a part of the first connector portion in the optical axis direction of the imaging apparatus, and
   wherein the second position is a position where the clamp unit does not overlap with the first connector portion in the optical axis direction.

3. The camera platform system according to claim 2, wherein, as an angle formed by the fixing unit and the supporting member changes, the clamp unit moves from the first to the second position.

4. The camera platform system according to claim 2,
   wherein the supporting member of the clamp unit is attachable to and detachable from the fixing unit, and
   wherein the clamp unit moves from the first to the second position when the supporting member is detached from the fixing unit.

5. The camera platform system according to claim 1, wherein the camera platform includes a rotating mechanism for rotating the imaging apparatus about the optical axis of the imaging apparatus.

6. The camera platform system according to claim 1,
   wherein each of the plurality of column members includes a first column portion and a second column portion,
   wherein the second column portion is located between the first column portion and the supporting member, and
   wherein the first column portion is larger than the second column portion in at least one of width and depth.

7. The camera platform system according to claim 6, wherein the first column portion is larger than the second column portion in width and depth.

8. The camera platform system according to claim 1,
   wherein the clamp unit includes a pressing plate on a top face of each of the plurality of column members, and
   wherein the pressing plate has a rotational axis in the optical axis direction and rotates about the rotational axis.

9. The camera platform system according to claim 1, wherein the camera platform and the imaging apparatus are disposed not to overlap with each other in the optical axis direction.

10. The camera platform system according to claim 1,
    wherein the control apparatus includes a second connector portion to which a connector cable for electrically connecting to the imaging apparatus is connected, and
    wherein the first and the second connector portions are provided on at least one of a front face and a rear face of a housing of the control apparatus.

11. The camera platform system according to claim 10, wherein a side face of the housing of the control apparatus includes neither the first nor the second connector portion.

12. The camera platform system according to claim 11, wherein a connector cable for connecting with a still camera is connected to the second connector portion.

13. The camera platform system according to claim 10, wherein a third connector portion to which a connector cable for connecting with an external apparatus other than the imaging apparatus and the camera platform is connected is provided on the housing of the control apparatus.

14. A camera platform system comprising:
    a fixing base configured to fix an imaging apparatus;
    a camera platform configured to rotate the imaging apparatus fixed to the fixing base in at least one of the panning, tilting, and rolling directions;
    a clamp unit attached to the fixing base and configured to clamp a connector cable for connecting between the imaging apparatus and the camera platform; and
    a fixing unit configured to attach the clamp unit to the fixing base,
    wherein the imaging apparatus includes a first connector portion to which a connector cable for connecting to the camera platform is connected,
    wherein the clamp unit includes a plurality of column members and a supporting member supporting the plurality of column members,
    wherein the fixing unit fixes the supporting member to fixing, and
    wherein the clamp unit can be in a state where the clamp unit does not overlap with the first connector portion of the imaging apparatus in an optical axis direction.

15. The camera platform system according to claim 14,
    wherein the clamp unit can be in a first position and a second position,
    wherein the first position is a position where at least a part of the clamp unit overlaps with at least a part of the first connector portion in the optical axis direction of the imaging apparatus, and
    wherein the second position is a position where the clamp unit does not overlap with the first connector portion in the optical axis direction.

16. The camera platform system according to claim 14,
    wherein each of the plurality of column members includes a first column portion and a second column portion,
    wherein the second column portion is located between the first column portion and the supporting member, and wherein the first column portion is larger than the second column portion in at least one of width and depth.

17. The camera platform system according to claim 14, wherein the camera platform and the imaging apparatus are disposed not to overlap with each other in the optical axis direction.

\* \* \* \* \*